(12) United States Patent
Boisture

(10) Patent No.: US 9,764,676 B2
(45) Date of Patent: Sep. 19, 2017

(54) TRAILER FOR LOADING AND UNLOADING HEAT EXCHANGER TUBE BUNDLES

(71) Applicant: Austin Industrial Services, LP, Dallas, TX (US)

(72) Inventor: Thomas B. Boisture, Baytown, TX (US)

(73) Assignee: Austin Industrial Services, LP, Dallas, TX (US)

( * ) Notice: Subject to any disclaimer, the term of this patent is extended or adjusted under 35 U.S.C. 154(b) by 260 days.

(21) Appl. No.: 14/454,233

(22) Filed: Aug. 7, 2014

(65) Prior Publication Data

US 2016/0039328 A1     Feb. 11, 2016

(51) Int. Cl.
*B60P 3/40*     (2006.01)
*B60P 7/12*     (2006.01)

(52) U.S. Cl.
CPC .. *B60P 3/40* (2013.01); *B60P 7/12* (2013.01)

(58) Field of Classification Search
CPC .. B60P 1/64; B60P 1/6409; B60P 1/00; B60P 3/40; B60P 3/00; B60P 7/12
See application file for complete search history.

(56) References Cited

U.S. PATENT DOCUMENTS

| | | | | |
|---|---|---|---|---|
| 1,247,034 A | * | 11/1917 | Thompson | B60P 1/025 414/345 |
| 1,426,408 A | * | 8/1922 | Pezzetti | E01H 1/047 414/345 |
| 2,467,354 A | * | 4/1949 | Baldwin | B60P 1/6436 414/343 |
| 3,471,047 A | * | 10/1969 | Burke | B60P 1/6418 104/48 |
| 3,614,153 A | * | 10/1971 | Tantlinger | B60P 1/6481 410/54 |
| 3,712,493 A | * | 1/1973 | Priefert | B60P 1/64 280/402 |
| 5,127,663 A | * | 7/1992 | Whitehead | B62D 53/005 280/404 |
| 7,794,188 B2 | * | 9/2010 | Whitehead | B65D 61/00 410/37 |

* cited by examiner

*Primary Examiner* — Glenn Myers
(74) *Attorney, Agent, or Firm* — Norton Rose Fulbright US LLP

(57) ABSTRACT

An improved trailer for loading and unloading a heat exchanger tube bundle is disclosed. The trailer provides for the transport of tube bundles and includes seal pans which capture debris and other materials falling from the tube bundle during transport. The present invention also provides for the periodic placement of slideable supports under a bundle as it is pushed onto a trailer.

10 Claims, 8 Drawing Sheets

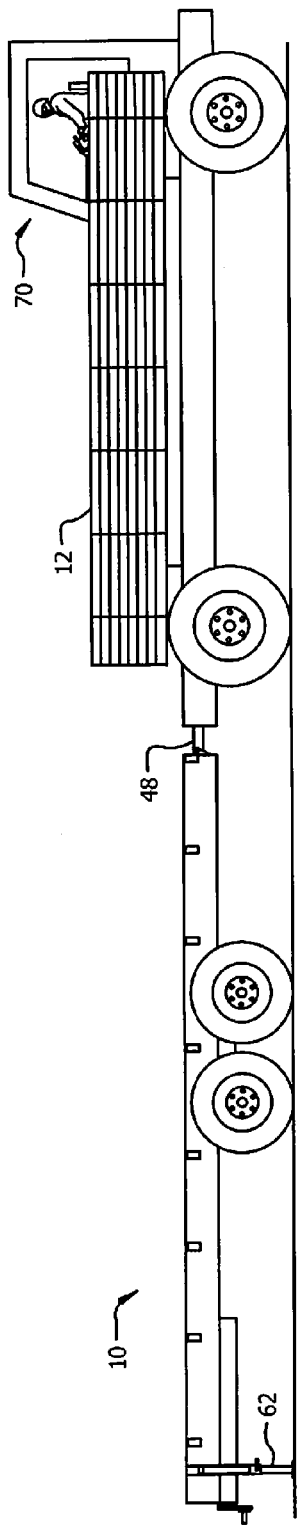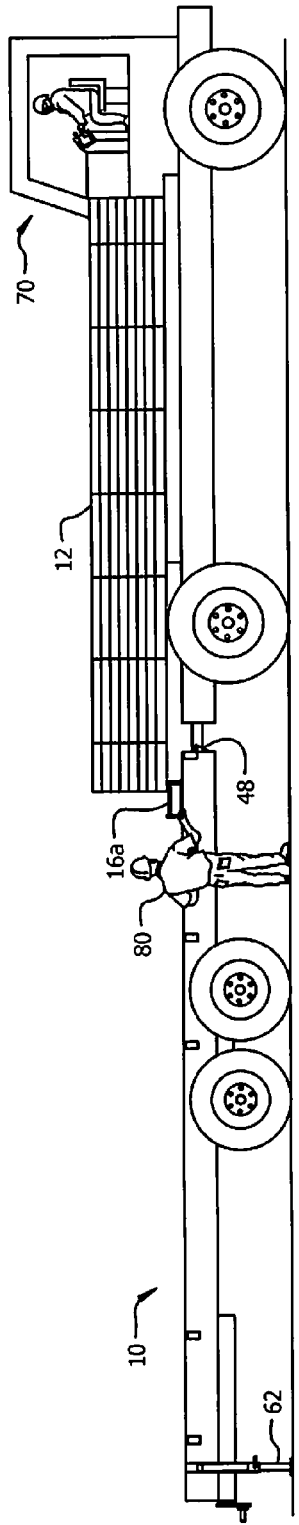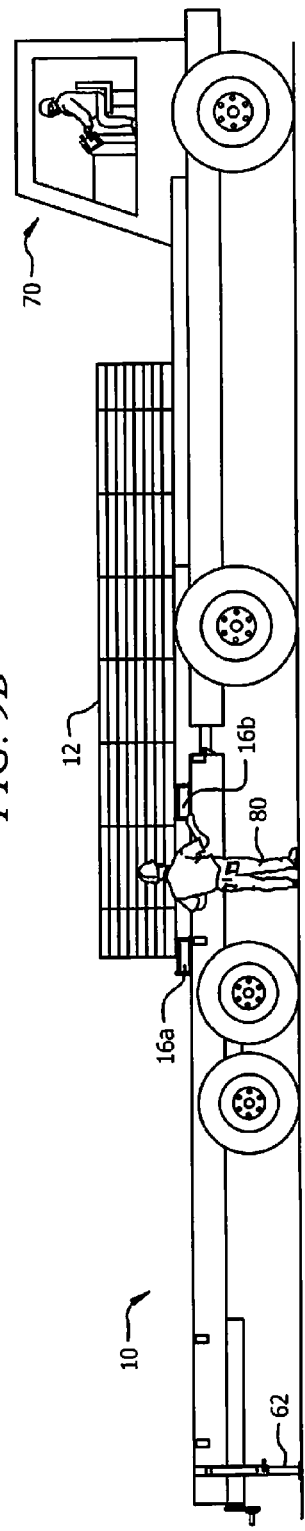

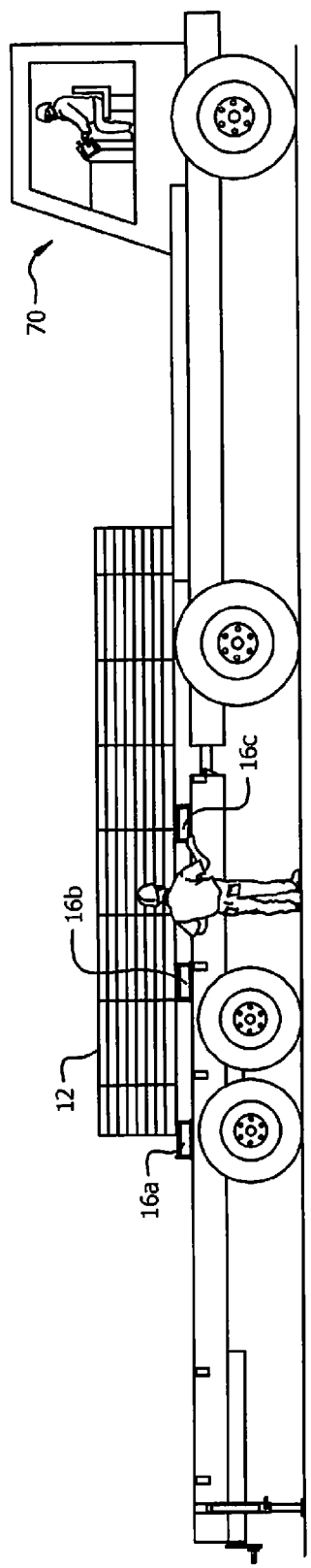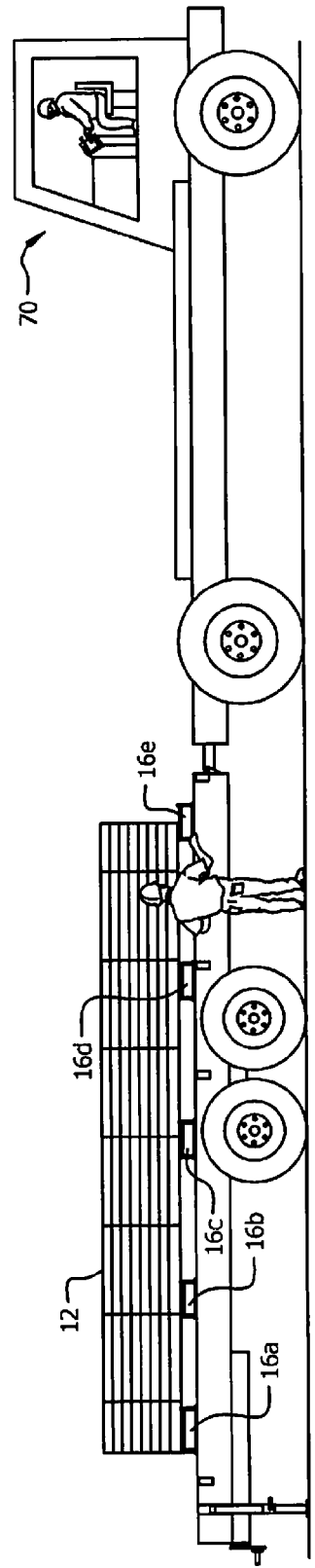

TRAILER FOR LOADING AND UNLOADING HEAT EXCHANGER TUBE BUNDLES

FIELD OF THE INVENTION

This invention relates to an apparatus for loading and unloading heat exchanger tube bundles. More particularly, this invention relates to an improved trailer for loading and unloading a heat exchanger tube bundle.

BACKGROUND OF THE INVENTION

Heat exchanger tube bundles are used for the transfer of heat from a fluid medium passing through a series of conduits. One of the fluids passes through a series of conduits, or tubes, while the other passes on the outside of the tubes. During this process, carbonaceous and calcareous deposits form on the interior of the individual tubes and debris and other dirt will collect on the surface of the individual tubes. Therefore, in order to maintain efficient operation of the facility it is necessary to periodically remove the tube bundles and clean them.

Before the tube bundles can be cleaned it is necessary to extract the tube bundle from an outer shell of the heat exchanger. Due to the large size of heat exchanger tube bundles, it is frequently necessary to transport the tube bundle a short distance within a given location, such as a refinery, to a designated cleaning site. In the prior art technique to transport the bundle it must first be lifted from the extractor with a large crane sue to its weight and bulk size and then placed on a trailer for transport to a cleaning site. Crane costs are high and add to the cost of maintaining heat exchangers. Additionally, crane availability may be an issue and may cause delays in getting the bundles transported to a cleaning site.

Therefore, the need exists for an improved trailer which is capable of being loaded without the need of a crane to handle the bundle.

SUMMARY OF THE INVENTION

Briefly, the invention relates to a trailer for loading and unloading a heat exchanger tube bundle having a base frame. The base frame includes substantially parallel longitudinal members. A wheel-supporting assembly is in contact with the base frame proximate the rear end of the trailer and is configured to provide a low profile for ease of loading and unloading a tube bundle. An elongated seal pan assembly is positioned adjacent to the longitudinal members to capture debris falling off the tube bundle during transport. At least two slideable support member is adapted to be slid along the top of substantially the entire length of the longitudinal members to ease the loading and unloading of the tube bundle. Connectors proximate the rear end of the longitudinal members may be included to permit the trailer to be connected to an extractor, thereby permitting the extractor to move the bundle relative to the trailer for placement of the bundle onto, or removal from, the trailer.

The foregoing has outlined rather broadly the features and technical advantages of the present invention in order that the detailed description of the invention that follows may be better understood. Additional features and advantages of the invention will be described hereinafter which also form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In order to fully understand the drawings used in the detailed description of the present invention, a brief description of each drawing is provided:

FIGS. 9A-9E are operational views of the present invention.

DETAILED DESCRIPTION OF THE INVENTION

Figure 1:
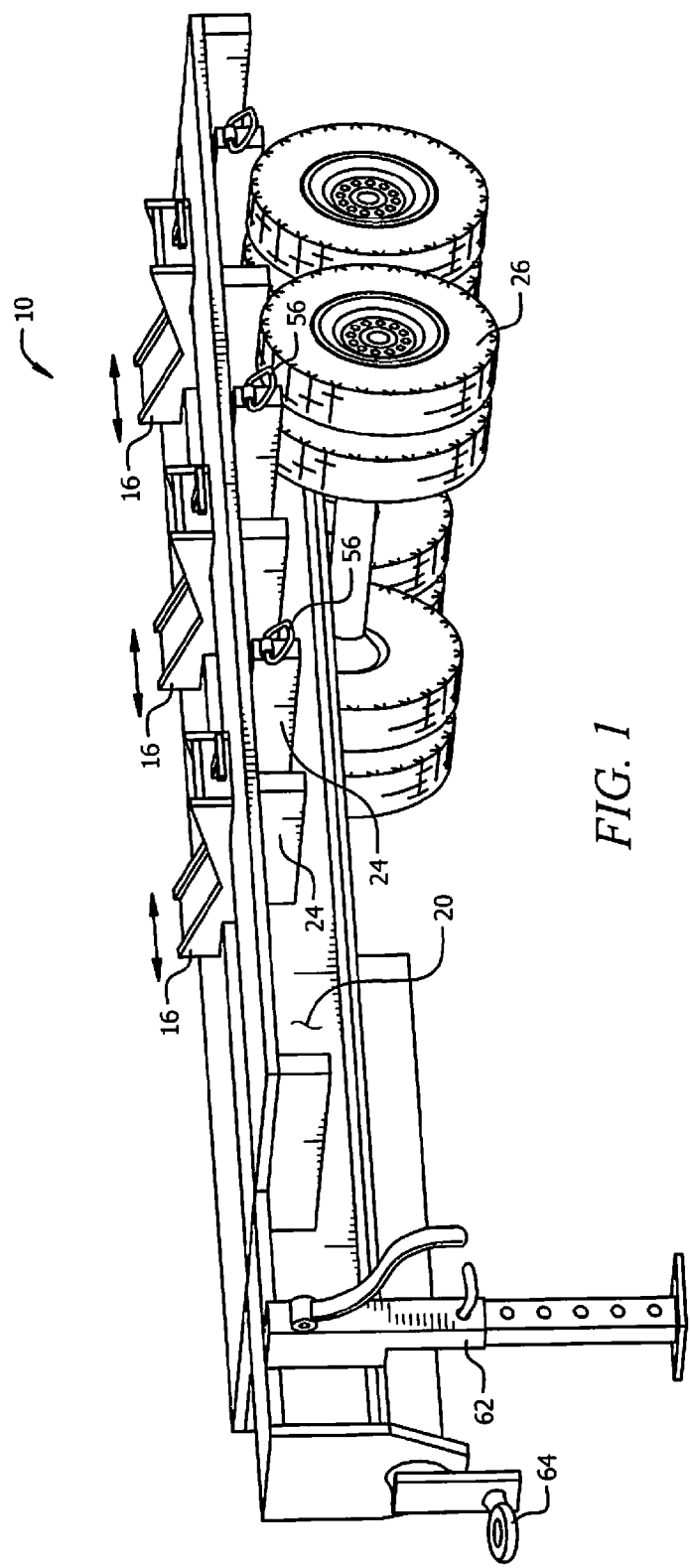
FIG. 1 is a perspective view of the present invention.
Figure 2:
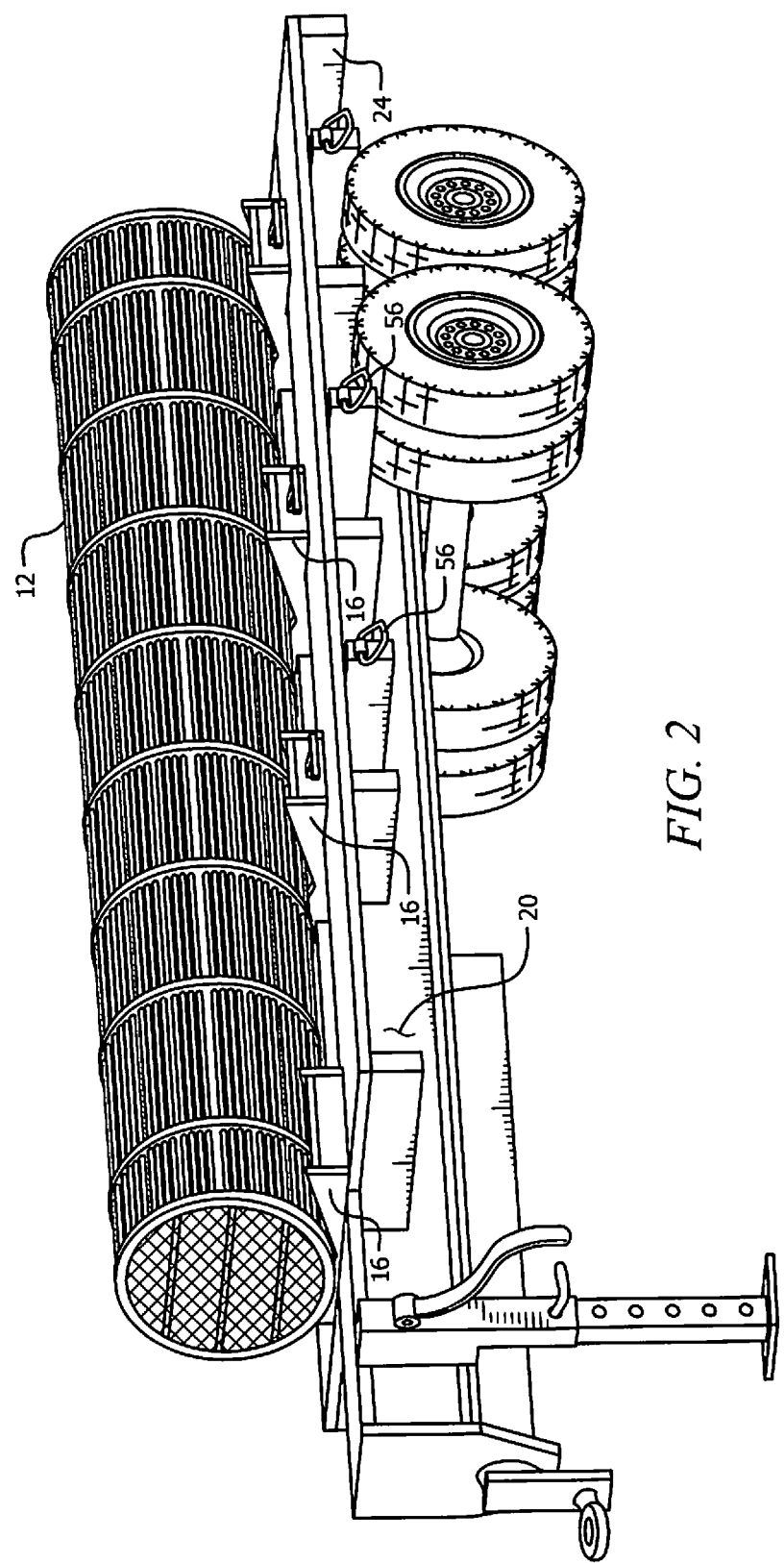
FIG. 2 is a perspective view of the present invention with a tube bundle.

Referring to FIGS. 1 and 2, perspective views of the present invention are shown comprising a trailer 10, adapted to transport a tube bundle 12. Tube bundle 12 is supported along its length by one or more slideable bundle supports 16 which are moveable in the directions of arrows 60.

Figure 3:
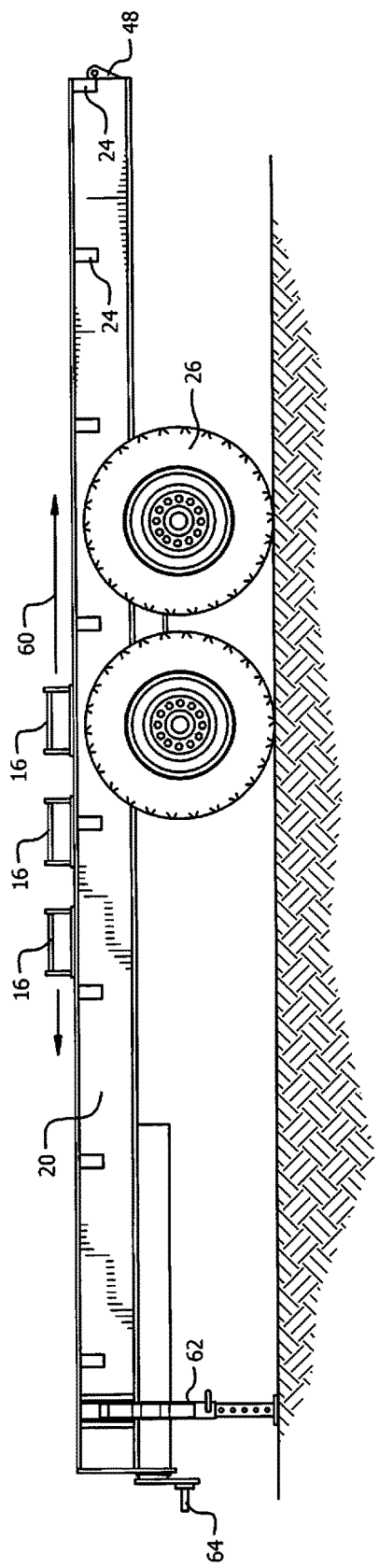
FIG. 3 is an elevation view of the present invention.
Figure 4:
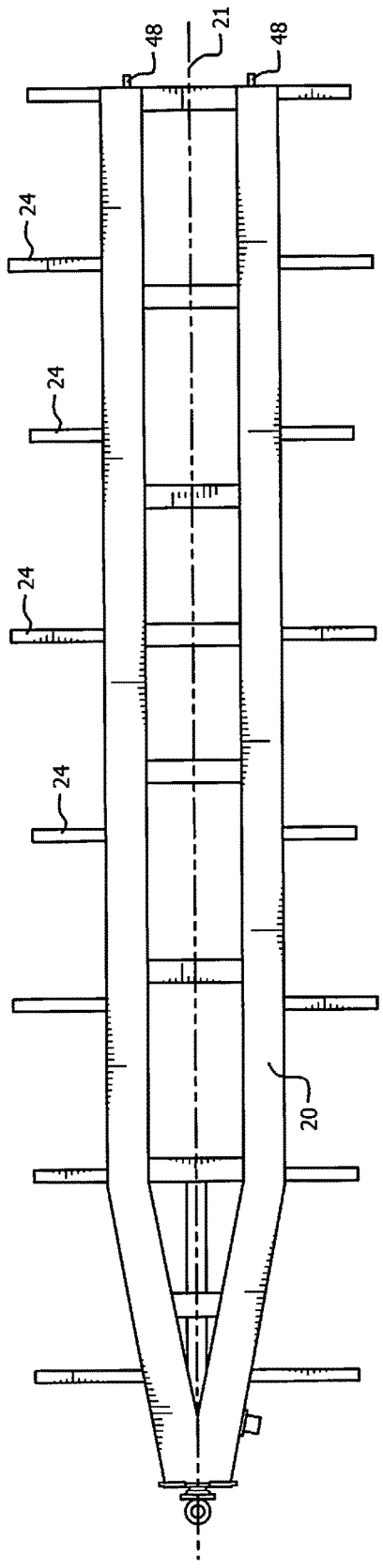
FIG. 4 is a top view of the base frame of the present invention.

Referring also to FIGS. 3 and 4, trailer 10 comprises a base 18 having longitudinal members 20 which extend along the longitudinal axis 21 of trailer 10. Interspersed between the longitudinal members 20 are transverse spacer beams 23 and outrigger members 24. A wheel assembly 26 is mounted toward the rear end of trailer 10 and provides mobile support while the trailer is being towed. The trailer may include a front jack 62 which is used when the trailer is in a stationary position. A front end eye-connector 64 is positioned at the front to engage a hook or other male-type connector so that the trailer may be towed.

Figure 5:
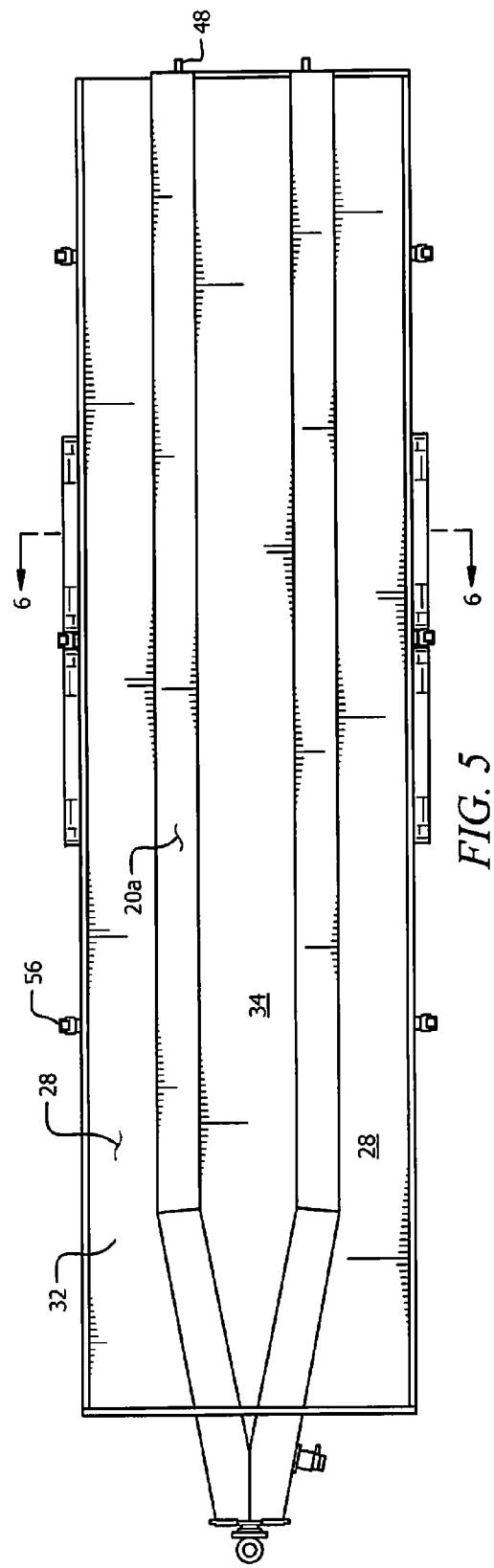
FIG. 5 is a top view of the present invention.
Figure 6:
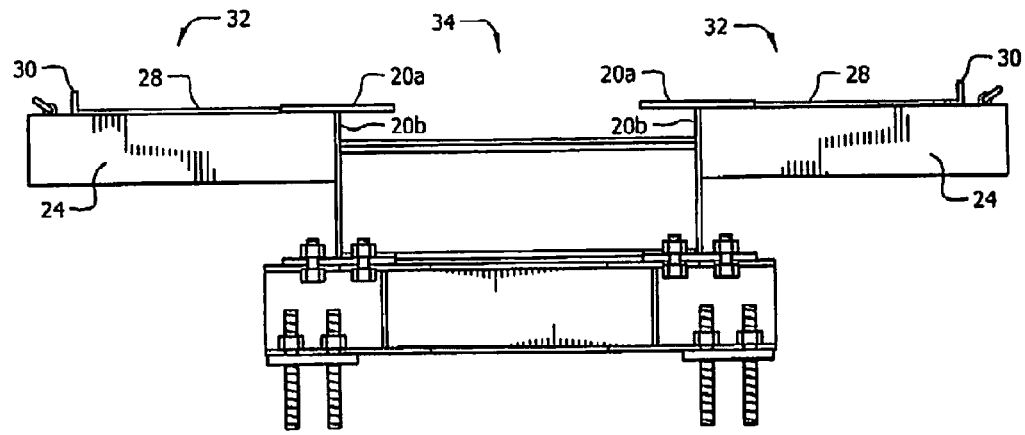
FIG. 6 is a cross-sectional view taken along line 6-6 of FIG. 5 without the wheel assembly.

Referring also now to FIGS. 5-6, a top view of trailer 10 is shown having horizontal outrigger plates 28 which are attached along one side to the top flange 20A. An outer vertical plate 30 is attached to the outer edge of each plate 28 thereby creating an outer seal pan 32 which may capture debris and other materials falling from the tube bundle during transport. Referring still to FIGS. 5 and 6, an interior horizontal plate 34 is positioned between longitudinal members 20. It is connected to the web 20B of each longitudinal member 20. Thus, plate 34 in combination with the web portion 20B of each longitudinal member serves to create an interior seal pan to capture debris and other materials falling from the tube bundle during transport.

Referring back to FIGS. 1 and 3, slideable supports 16 are shown positioned between and along the length of the longitudinal members 20. This permits supports 16 to more evenly carry the distributed load of the bundle and when loading or unloading a bundle to slide freely along the longitudinal axis 21 as discussed in more detail below.

Figure 7:
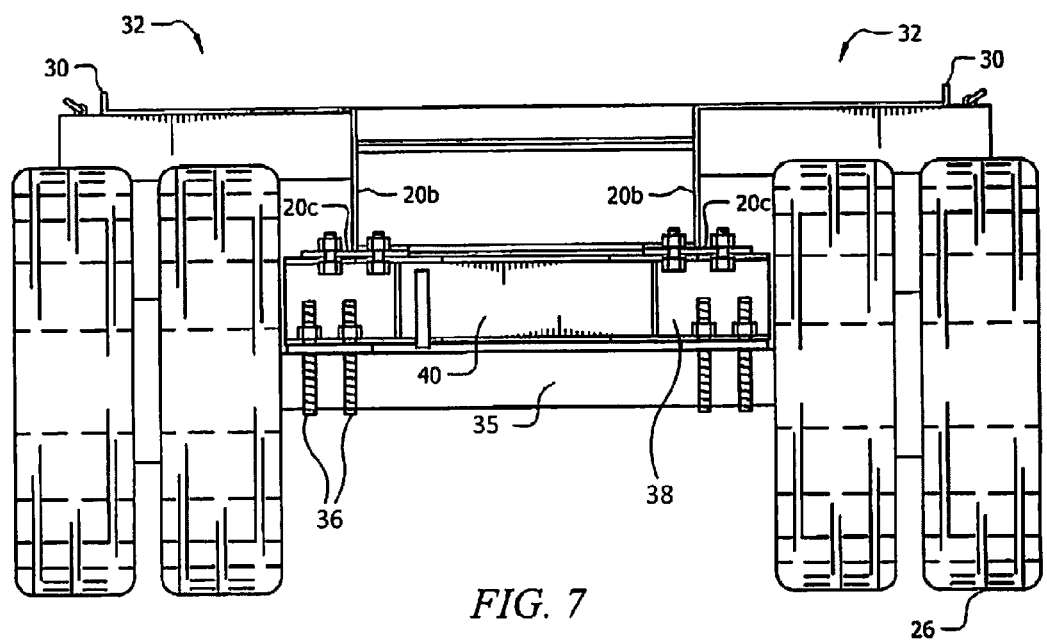
FIG. 7 is a cross-sectional view taken along line 6-6 of FIG. 5.

FIG. 7 is a cross section view taken along line 6-6 of FIG. 5 showing the wheel assembly 26 attached to longitudinal members 20. Using conventional techniques well known to those skilled in the art, the wheel assembly 26 includes an axle 35 which may be clamped by brackets 36 to a subassembly 38. Subassembly 38 comprises a transverse beam member 40 which is shown bolted to the bottom flange 20C of longitudinal members 20. The overall height of the wheel assembly is minimized using the smallest size wheels/tires and transverse beam 40 possible. Since the trailer is preferably used on a restricted site, such as a refinery, the trailer may not have to meet minimum DOT and/or state requirements for use on a public road or highway. Thus, a lower profile for the trailer is achievable, which is preferable in the operation of the invention since some outer shells housing heat exchangers are at ground level.

Figure 8A:
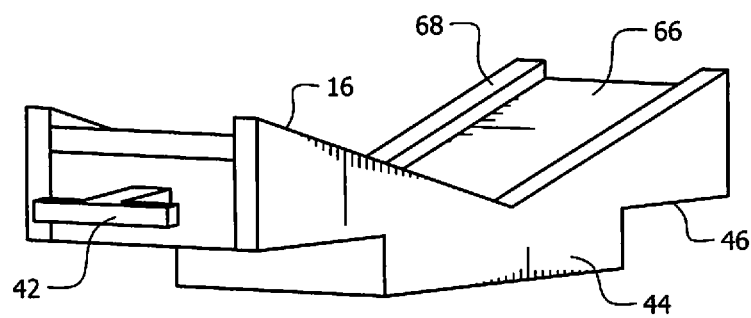
FIGS. 8A and 8B are perspective views of a portion of the present invention.
Figure 8B:
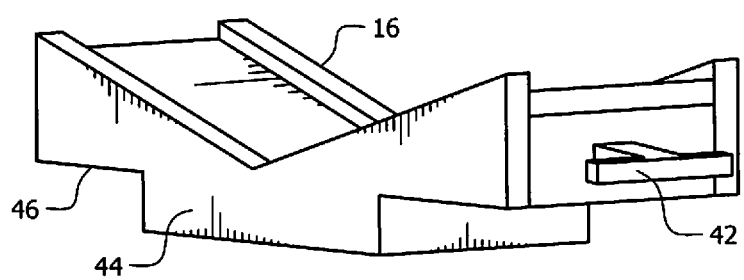

Referring now to FIGS. 8A and 8B, slideable support 16 is shown in a perspective view. Each slideable support is fabricated of a series of plates as shown including side plates 68 extending slightly above inclined plates 66. The support may also include a handle 42 on either end which enables the operator to raise or lower, and reposition, the slideable support as necessary. Each side plate 68 also includes an indented portion 44 which sits between the two longitudinal members 20 and a flat portion 46 which serves to sit or rest on top of flange 20A of each longitudinal member 20. It will be apparent to one of ordinary skill in the art that such a support may easy slide in the directions of arrows 60 (FIG. 3) in the operation of the present invention. If necessary a lubricant may be used on the top of flanges 20A so that the supports 16 are more easily slideable along longitudinal members 20 particularly when a bundle is being loaded or off-loaded from the trailer as described herein.

Referring back to FIG. 4, the trailer also includes connectors 48 attached to the rear end 50 of the trailer that enable an extractor to affix itself to rear end 50 so that the trailer does not move relative to the extractor as the bundle is moved relative to the trailer during loading or unloading. Such may be necessary as the load required to get a bundle to start moving out of the shell or following a resting period on the trailer can be significant.

Referring now to FIGS. 9A through 9E, in the operation of the present invention, a traditional extractor 70, well known to those skilled in the art, is maneuvering a bundle 12 which was previously extracted from a shell (not shown). The extractor positions itself at the rear end of trailer 10 and connects via connectors 48. In this manner, trailer 10 and extractor 70 act as a single body relative to bundle 12. Once connected, the bundle 12 which is supported on a moveable carriage assembly (not shown but well known to those skilled in the art) within extractor 70 advances the bundle forward onto trailer 10. As the bundle advances onto trailer 10, an operator 80 places a first slideable support 16A beneath the front end of the bundle 12. As the bundle advances forward as shown in FIGS. 9C-9E, the operator 80 continues to periodically introduce another slideable support 16B-E under the bundle 12 to support it as it advances forward onto trailer 10. After the bundle if fully loaded onto the trailer, come-alongs or straps may be attached over the bundle and connected to side connectors 56. For the removal of a bundle 12 from a trailer 10, the process described above is simply reversed. That is, an extractor 70 would connect to the trailer 10 and engage bundle 12. The extractor would then pull bundle 12 off trailer 10 onto a carriage assembly within the extractor 70. As the tube bundle advanced back onto the extractor, an operator 80 would remove each slideable support 16A-E from under bundle 12 as it advanced onto the extractor.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A trailer for transporting a heat exchanger bundle comprising:
   a base frame having at least two substantially parallel longitudinal support members defining a first exterior edge and a second exterior edge;
   a wheel assembly in contact with the base frame;
   an elongated seal pan to capture debris falling from the heat exchanger bundle, the elongated seal pan comprising:
      a central seal pan comprising a central horizontal plate positioned between, and extending along a length of, the at least two substantially longitudinal support members of the base frame, wherein the central horizontal plate is positioned below a top of each of the at least two substantially parallel longitudinal support members, wherein the at least two substantially parallel longitudinal support members form sides of the central seal pan, and wherein the central horizontal plate and the sides of the central seal pan form a channel,
      a first exterior seal pan comprising a first horizontal plate positioned along, and extending along a length of, the first exterior edge, and
      a second exterior seal pan comprising a second horizontal plate positioned along, and extending along a length of, the second exterior edge,
      wherein the first exterior seal pan extends outwardly from the first exterior edge in a direction away from the second exterior edge and the second exterior seal pan extends outwardly in a direction away from the first exterior edge; and
   at least two slide plates adapted to slide along a top of said longitudinal members to support the bundle during transport, wherein during placement of the bundle on, or removal from, the trailer, said slide plates move longitudinally relative to said longitudinal members as the heat exchanger bundle is moved on or off the trailer, wherein a bottom of each of the at least two slide plates comprises an indented portion and a flat portion on each side of the indented portion, so that when a slide plate is placed on the trailer, the indented portion of the slide plate is disposed within the channel and the flat portion on each side of the indented portion rests above one of the at least two substantially parallel longitudinal support members.

2. The trailer according to claim 1 wherein said trailer comprises at least three slide plates.

3. The trailer according to claim 1, wherein each of said at least two slide plates comprises:
   a first handle extending outwardly from a first lateral edge; and
   a second handle extending outwardly from a second lateral edge.

4. The trailer according to claim 1, wherein an upper surface of each of said at least two slide plates comprises a concave shape configured to cradle the heat exchanger bundle during placement of the heat exchanger bundle on, removal of the heat exchanger bundle from, or transport of the heat exchanger bundle while on, the trailer.

5. The trailer according to claim 3, wherein an upper surface of a particular slide plate of the at least two slide plates is inclined in a first direction from a medial portion of the particular slide plate towards the first lateral edge and inclined in a second direction from the medial portion of the particular slide plate towards the second lateral edge of the particular slide plate to define a concave shape of the particular slide plate, the concave shape configured to cradle the heat exchanger bundle during placement of the heat exchanger bundle on, removal of the heat exchanger bundle from, or transport of the heat exchanger bundle while on, the trailer.

6. The trailer according to claim 1, further comprising a first vertical plate attached to the first exterior seal pan and a second vertical plate attached to the second exterior seal pan, wherein a first longitudinal edge of the first vertical plate is attached to the first exterior seal pan and a second longitudinal edge of the first vertical plate is open, wherein a first longitudinal edge of the second vertical plate is attached to the second exterior seal pan and a second longitudinal edge of the second vertical plate is open, and wherein the first vertical plate forms a vertical wall proximate to an exterior edge of the first exterior seal pan and the second vertical plate forms a vertical wall proximate to an exterior edge of the second exterior seal pan.

7. The trailer according to claim 1, further comprising a plurality of support members oriented transverse to the at least two substantially parallel longitudinal support members, wherein the plurality of support members are positioned to provide support to at least one of the first horizontal plate and the second horizontal plate.

8. The trailer according to claim 1, further comprising one or more connectors proximate ends of the at least two substantially parallel longitudinal members support proximate said wheel assembly, wherein during placement of the bundle on, or removal from, the trailer, said one or more connectors are attached to a mobile bundle extractor prohibiting separation of the trailer from the mobile bundle extractor.

9. A trailer for transporting a heat exchanger bundle comprising:
   a base frame having at least two substantially parallel longitudinal support members defining a first exterior edge and a second exterior edge;
   a wheel assembly in contact with the base frame;
   an elongated seal pan positioned adjacent said at least two substantially parallel longitudinal support members, said elongated seal pan comprising:
      a central seal pan comprising a central horizontal plate positioned between, and extending along a length of, the at least two substantially longitudinal support members of the base frame, wherein the central horizontal plate is positioned below a top of each of the at least two substantially parallel longitudinal support members, wherein the at least two substantially parallel longitudinal support members form sides of the central seal pan, and wherein the central horizontal plate and the sides of the central seal pan form a channel,
      a first exterior seal pan comprising a first horizontal plate positioned along, and extending along a length of, the first exterior edge, and
      a second exterior seal pan comprising a second horizontal plate positioned along, and extending along a length of, the second exterior edge,
      wherein the first exterior seal pan extends outwardly from the first exterior edge in a direction away from the second exterior edge and the second exterior seal pan extends outwardly in a direction away from the first exterior edge, said first exterior edge and said second exterior edge of the base frame positioned generally parallel with one of said longitudinal support members; and
   at least two slide plates adapted to slide along a top of said longitudinal members to support the bundle during transport, wherein an upper surface of each of said at least two slide plates comprises a concave shape configured to cradle the heat exchanger bundle during placement of the heat exchanger bundle on, removal of the heat exchanger bundle from, or transport of the heat exchanger bundle while on, the trailer, wherein a bottom of each of the at least two slide plates comprises an indented portion and a flat portion on each side of the indented portion, so that when a slide plate is placed on the trailer, the indented portion of the slide plate is disposed within the channel and the flat portion on each side of the indented portion rests above one of the at least two substantially parallel longitudinal support members; and
   one or more connectors proximate ends of the at least two substantially parallel longitudinal members support proximate said wheel assembly, wherein during placement of the bundle on, or removal from, the trailer, said one or more connectors are attached to an extractor prohibiting separation of the trailer from the extractor, and said slide plates move longitudinally relative to said longitudinal members as the heat exchanger bundle is moved on or off the trailer.

10. A trailer for transporting a heat exchanger bundle comprising:
   a base frame having at least two substantially parallel longitudinal support members defining a first exterior edge and a second exterior edge;
   a wheel assembly in contact with the base frame;
   an elongated seal pan positioned adjacent said longitudinal members, said seal pan comprising:
      a central seal pan comprising a central horizontal plate positioned between, and extending along a length of, the at least two substantially longitudinal support members of the base frame, positioned between said longitudinal support members, wherein the at least two substantially parallel longitudinal support members form sides of the central seal pan, and the central plate and the sides of the central seal pan form a channel, a first exterior seal pan comprising a first horizontal plate positioned along, and extending along a length of, the first exterior edge, and a second exterior seal pan comprising a second horizontal plate positioned along, and extending along a length of, the second exterior edge, wherein said central and first and second seal pans are generally parallel along a longitudinal axis of the trailer;

at least two slide plates adapted to slide along a top of said longitudinal members to support the bundle during transport, wherein an upper surface of each of said at least two slide plates has a concave shape configured to cradle the heat exchanger bundle during placement of the heat exchanger bundle on, removal of the heat exchanger bundle from, or transport of the heat exchanger bundle while on, the trailer; and a first vertical elate attached to the first exterior seal pan and a second vertical plate attached to the second exterior seal pan, wherein a first longitudinal edge of the first vertical plate is attached to the first exterior seal pan and a second longitudinal edge of the first vertical plate is open, wherein a first longitudinal edge of the second vertical plate is attached to the second exterior seal pan and a second longitudinal edge of the second vertical plate is open, and wherein the first vertical plate forms a vertical wall proximate to an exterior edge of the first exterior seal pan and the second vertical plate forms a vertical wall proximate to an exterior edge of the second exterior seal pan.

\* \* \* \* \*

UNITED STATES PATENT AND TRADEMARK OFFICE
CERTIFICATE OF CORRECTION

PATENT NO. : 9,764,676 B2
APPLICATION NO. : 14/454233
DATED : September 19, 2017
INVENTOR(S) : Thomas B. Boisture It is certified that error appears in the above-identified patent and that said Letters Patent is hereby corrected as shown below:

In the Claims

At Column 7, Claim number 10, Line number 18, delete "elate" and replace with --plate--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*